UNITED STATES PATENT OFFICE.

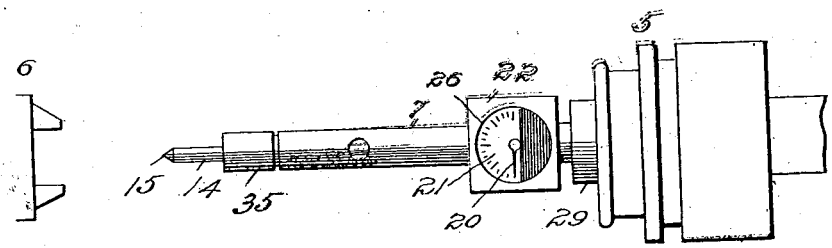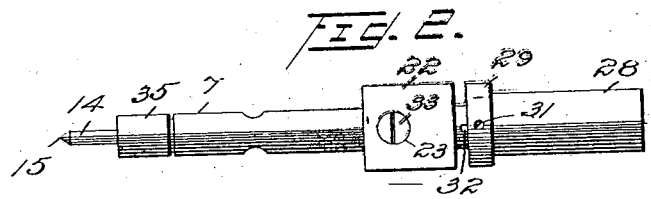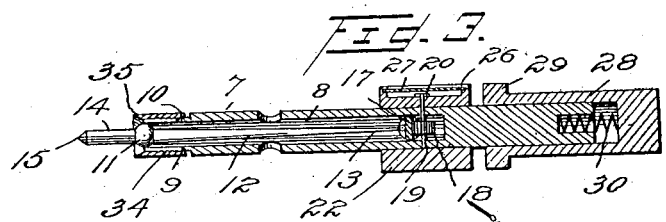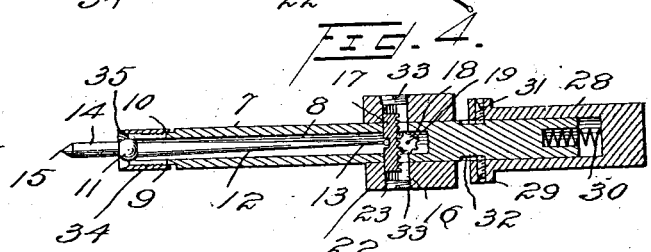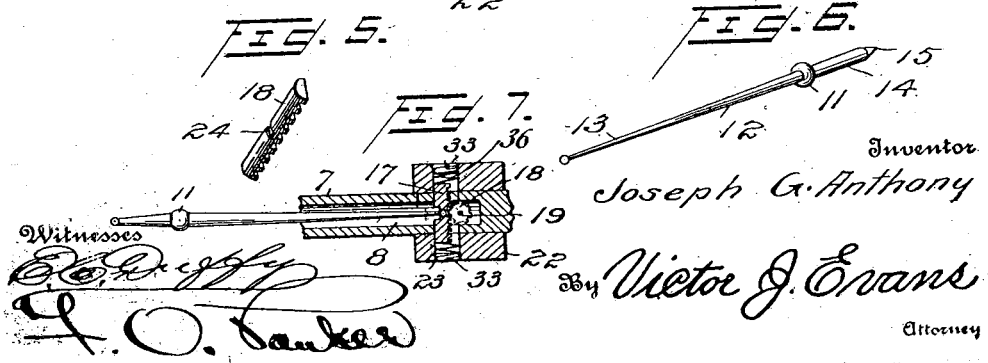

JOSEPH G. ANTHONY, OF DETROIT, MICHIGAN.

CENTER-INDICATING DEVICE.

1,058,027. Specification of Letters Patent. Patented Apr. 8, 1913.

Application filed March 27, 1912. Serial No. 686,604.

*To all whom it may concern:*

Be it known that I, JOSEPH G. ANTHONY, a citizen of the United States, residing at Detroit, in the county of Wayne and State of Michigan, have invented new and useful Improvements in Center-Indicating Devices, of which the following is a specification.

The invention relates to indicating devices, and more particularly to the class of center indicating devices for use in lathes, milling or other machinery.

The primary object of the invention is the provision of a centering device of this character in which the chuck of a lathe boring or milling machine may be accurately centered with relation to the work to be operated upon.

Another object of the invention is the provision of a device of this character which is designed to be used in adjusting and locating centrally any point or hole in a piece of work operated upon in a lathe chuck or on a face plate of any other machine, and also that will enable the testing of the truth of lathe centers or a shaft between the centers.

A further object of the invention is the provision of a center indicating device of this character which is simple in construction, reliable and efficient in operation, easily read and very sensitive in action and also that may be manufactured at a minimum cost.

With these and other objects in view, the invention consists in the construction, combination and arrangement of parts as will be hereinafter more fully described, illustrated in the accompanying drawing, and pointed out in the claims hereunto appended.

In the drawing: Figure 1 is a top plan view of a lathe chuck and work support showing the center indicating device constructed in accordance with the invention mounted in the chuck. Fig. 2 is a side elevation of the device removed from the chuck. Fig. 3 is a vertical longitudinal sectional view thereof. Fig. 4 is a transverse longitudinal sectional view. Fig. 5 is a perspective view of the rack. Fig. 6 is a perspective view of the oscillatory centering pin. Fig. 7 is a fragmentary transverse longitudinal sectional view showing a slight modification of the device.

Similar reference characters indicate corresponding parts throughout the several views in the drawing.

Referring to the drawing by numerals, 5 designates generally a chuck of a lathe, milling, drilling, or any other machinery, and is of the ordinary well-known construction, and 6 is the work support therefor, in which the piece of work is to be mounted for operation upon by the machine. Prior to the fitting of a tool within the chuck 5 to be engaged with the piece of work, is placed therein a center indicating device presently described.

The indicating device comprises a circular shank 7 provided with a center bore 8 extending throughout a greater portion of the length of the same and opening through one end thereof. The shank 7 is formed with reduced end 9, through which the said bore 8 opens, and is provided with slits 10 forming a resilient socket in which is engaged the spherical portion 11 of a centering pin 12 having its inner end portion 13 extended within the bore 8 for oscillatory movement therein while its outer end 14 is formed with a tapered point 15 adapted to engage in a center indication or mark in or on the piece of work to be operated upon by the machine for indicating the axis of the true center of the work in a manner presently described.

Formed transversely in the shank 7 and intersecting the bore 8 there is near its rear end is a guide opening 16 in which is mounted a laterally displaceable tooth rack bar 17 meshing with a gear pinion 18 fixed to the vertical axle portion 19 of an indicator hand 20 traversable over a graduated dial 21 mounted within a cube-shaped block 22 detachably fixed on the shank 7, the block 22 being formed with threaded apertures 23 registering with the transverse opening 16 to form a guide way therein for the said rack bar 17. The axle portion 19 of the indicator hand 20 is journaled in the shank 7 so that the latter may freely rotate over the dial 21 on the turning of the gear pinion 18 when the rack bar 17 is laterally shifted. The rack bar is formed with a notch 24 in its forward edge which loosely engages the ball terminal of the inner end portion 13 of the centering pin 12, whereby on the lateral oscillation of the centering pin the rack bar will be simultaneously moved therewith so that the indicator hand 20 will traverse the dial 21 to enable the accurate reading of the degree of angular disposition of the indicator pin. Thus, it will be seen that the centering pin may be adjusted to accurately ascertain the true center of the piece of work to be operated upon by the machine, and thereafter the indicating device can be detached from the chuck, it being understood of course that the support for the latter is locked in its true adjusted position prior to the removal of the indicating device, so that when the tool is inserted in the chuck it will be sustained in true central adjustment with relation to the piece of work.

To protect the indicator hand 20 and the dial 21 and also to make the same visible there is provided a peep opening 26 in the block 22 and this opening is covered by a transparent disk 27.

Loosely surrounding the closed end of the shank 7 is a sleeve 28 formed at its inner end with an abutment flange 29 the sleeve being designed to fit into the chuck 5 and is closed at its outer end to form a bearing for a compression spring 30 arranged within the said sleeve and engaging the closed end of the shank 7 so as to permit slight longitudinal movement of the shank in the sleeve thereby avoiding the blunting of the point 15 of the indicator pin 12 when being moved into engagement with a piece of work. Threaded in diametrically opposite points of the flange 29 on the sleeve 28 are guide pins or screws 31, the inner ends of which loosely engage in elongated guide grooves 32 formed in the shank 7 so that in this manner the said shank is prevented from rotation in the sleeve 28 when the latter is mounted in the chuck but will be free to move longitudinally against the resistance of the compression spring 30 when setting the indicator device with respect to the piece of work.
Engaged in the threaded apertures 23 in the block 22 are adjustable plugs 33 which limit the lateral shifting of the rack bar 17 in said block.

Formed on the reduced end exteriorly thereof are screw threads 34 with which engages a locking collar 35 to retain the spherical portion 11 of the pin 12 in the said reduced end 9 of the shank and thereby avoids the accidental detachment of the centering pin from the shank of the device while in use.

From the foregoing description, taken in connection with the accompanying drawing, it is thought that the construction and operation of the invention will be clearly understood, and therefore a more extended explanation has been omitted.

In Fig. 7 there is shown a slight modification of the invention wherein the rack member 17 is acted upon by means of expansion springs 36 which hold said rack member normally centrally located within the block 22 as is clearly shown.

What is claimed is:—

1. An indicator device comprising a shank, having a bore opening through one end and also a transverse opening between its ends intersecting said bore, a centering pin swiveled in the open end of the shank, a block carried by the shank and having a graduated dial therein, an indicating pointer adapted to rotate over the dial, and having an axle journaled in the shank, a gear wheel fixed to said axle and concealed within the shank, and a rack bar meshing with said gear wheel and loosely engaged by the end of the centering pin.

2. An indicator device comprising a shank, having a bore opening through one end and also a transverse opening between its ends intersecting said bore, a centering pin swiveled in the open end of the shank, a block carried by the shank and having a graduated dial therein, an indicating pointer adapted to rotate over the dial, and having an axle journaled in the shank, a gear wheel fixed to said axle and concealed within the shank, a rack bar meshing with said gear wheel and loosely engaged by the end of the centering pin, a sleeve surrounding the closed end of the shank, pins connecting the sleeve to the shank to permit slight longitudinal displacement of the latter and spring compression means arranged within the sleeve and working against the closed end of the shank for tensioning it on the longitudinal displacement thereof.

In testimony whereof I affix my signature in presence of two witnesses.

JOSEPH G. ANTHONY.

Witnesses:
JAMES C. FERGUSON,
EDWARD ANTHONY.